United States Patent
Zhao et al.

(10) Patent No.: US 11,641,632 B2
(45) Date of Patent: May 2, 2023

(54) METHOD FOR DETERMINING SYNCHRONIZATION SOURCE AND TERMINAL

(71) Applicant: DATANG MOBILE COMMUNICATIONS EQUIPMENT CO., LTD., Beijing (CN)

(72) Inventors: Li Zhao, Beijing (CN); Ying Peng, Beijing (CN); Rui Zhao, Beijing (CN); Chenxin Li, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 25 days.

(21) Appl. No.: 17/256,450

(22) PCT Filed: May 15, 2019

(86) PCT No.: PCT/CN2019/086991
§ 371 (c)(1),
(2) Date: Dec. 28, 2020

(87) PCT Pub. No.: WO2020/001188
PCT Pub. Date: Jan. 2, 2020

(65) Prior Publication Data
US 2021/0274457 A1  Sep. 2, 2021

(30) Foreign Application Priority Data
Jun. 29, 2018  (CN) .......................... 201810700696.7

(51) Int. Cl.
*H04W 56/00* (2009.01)
*H04B 17/318* (2015.01)

(52) U.S. Cl.
CPC ...... *H04W 56/0015* (2013.01); *H04B 17/318* (2015.01)

(58) Field of Classification Search
CPC .......................... H04W 56/0015; H04B 17/318
See application file for complete search history.

(56) References Cited

U.S. PATENT DOCUMENTS

2016/0212594 A1  7/2016 Morita et al.
2016/0249307 A1  8/2016 Thangarasa et al.
(Continued)

FOREIGN PATENT DOCUMENTS

CN  107027164 A  8/2017
CN  107852685 A  3/2018
(Continued)

OTHER PUBLICATIONS

First Office Action dated Apr. 23, 2020 in Chinese Application No. 201810700696.7.
(Continued)

*Primary Examiner* — Saad A. Waqas
(74) *Attorney, Agent, or Firm* — Harness, Dickey & Pierce, P.L.C.

(57) ABSTRACT

A method for determining a synchronization source and a terminal are provided. The method includes: detecting a synchronization signal of a global navigation satellite system GNSS; when the synchronization signal of the GNSS is detected, using the GNSS as the synchronization source of a terminal; otherwise, determining the synchronization source of the terminal according to receiving capability of the terminal and network configuration information.

12 Claims, 1 Drawing Sheet

(56) References Cited

U.S. PATENT DOCUMENTS

| | | | |
|---|---|---|---|
| 2017/0289935 A1* | 10/2017 | Yoon | .................. H04L 27/2692 |
| 2018/0220388 A1 | 8/2018 | Chae et al. | |
| 2018/0234928 A1 | 8/2018 | Yasukawa et al. | |
| 2019/0069255 A1 | 2/2019 | Zhao et al. | |
| 2019/0239175 A1 | 8/2019 | Kim et al. | |
| 2020/0045660 A1 | 2/2020 | Lee et al. | |

FOREIGN PATENT DOCUMENTS

| | | | | |
|---|---|---|---|---|
| CN | 107852690 | A | | 3/2018 |
| EP | 3001631 | A1 | | 3/2016 |
| EP | 3337253 | A1 | | 6/2018 |
| EP | 3499945 | A1 | | 6/2019 |
| EP | 3512267 | A1 | | 7/2019 |
| EP | 3522405 | A1 | | 8/2019 |
| KR | 2018-0036565 | A | | 4/2018 |
| WO | WO-2017/078599 | A1 | | 5/2017 |
| WO | WO-2018/028347 | A1 | | 2/2018 |
| WO | WO-2018028347 | A1 | * | 2/2018 ........... H04L 1/0038 |
| WO | WO-2018/070845 | A1 | | 4/2018 |
| WO | WO-2018070845 | A1 | * | 4/2018 ........ H04W 56/0015 |

OTHER PUBLICATIONS

Catt, et al., "WF on Synchronization," 3GPP TSG RAN WG1 Meeting #82bis, Ri-156172, Oct. 9, 2015.

Itri, "Discussion on Synchronization Aspects for Carrier Aggregation in V2X Phase 2," 3GPP TSG RAN Meeting 92, R1-1802078, Mar. 2, 2018.

International Preliminary Report on Patentability dated Dec. 29. 2020 in International Application No. PCT/CN2019/086991.

CA Extended European Search Report dated Jul. 16, 2021 for Application No. EP 19 82 6593.

* cited by examiner

METHOD FOR DETERMINING SYNCHRONIZATION SOURCE AND TERMINAL

CROSS-REFERENCE TO RELATED APPLICATIONS

The present application is the U.S. national phase of PCT Application No. PCT/CN2019/086991 filed on May 15, 2019, which claims a priority of the Chinese patent application No. 201810700696.7 filed on Jun. 29, 2018, which is incorporated herein by reference in its entirety.

TECHNICAL FIELD

The present disclosure relates to the field of communication technology, and in particular to a method for determining a synchronization source and a terminal.

BACKGROUND

In the LTE-V2X protocol of 3GPP Rel-14/Rel-15, the sub-carrier spacing (SCS) is fixed value of 15 kHz, and there are three kinds of synchronization modes for the synchronization source, that are Global Navigation Satellite System (GNSS) synchronization, eNB Synchronization and self-synchronization between User Equipment (UE) (or terminals). Rel-14 only considers single-carrier synchronization processing, and Rel-15 considers multi-carrier synchronization processing, and supports up to 8 carriers.

In the case of single-carrier synchronization processing in Rel-14, the strength of the synchronization signal and synchronization priority need to be considered to determine the synchronization source. If the base station can synchronize with the GNSS, the base station needs to notify the UE of the synchronization deviation DFN Offset with the GNSS by broadcasting.

In the case of multi-carrier synchronization processing in Rel-15, because the synchronization type (based on GNSS or eNB) is notified to the UE at the granularity of the carrier, there are multiple synchronization sources in the aggregated carrier, and the specific synchronization mechanism has not been defined in the related technology.

SUMMARY

The purpose of the present disclosure is to provide a method for determining a synchronization source and a terminal. In the case of multiple synchronization sources, a synchronization source may be determined for the terminal.

In order to solve the above technical problem, some embodiments of the present disclosure provides the following technical solution.

A method for determining a synchronization source is applied to a terminal and includes: detecting a synchronization signal of a global navigation satellite system (GNSS); when the synchronization signal of the GNSS is detected, using the GNSS as the synchronization source of a terminal; otherwise, determining the synchronization source of the terminal according to receiving capability of the terminal and network configuration information.

In some embodiments, after using the GNSS as the synchronization source of the terminal, the method further includes: sending the synchronization signal on a synchronization sub-frame of configured different bandwidth parts (BWP) according to subcarrier spacing (SCS) supported by the terminal and sending capability of the terminal.

In some embodiments, the determining the synchronization source of the terminal according to the capabilities of the terminal and network configuration information includes: detecting the synchronization signal sent by the synchronization source on the synchronization sub-frame of the configured different BWPs according to the receiving capability of the terminal and the SCS supported by the terminal; and determining the synchronization source of the terminal according to the synchronization signal sent by the synchronization source.

In some embodiments, when the terminal supports one synchronization source, the determining the synchronization source of the terminal according to the synchronization signal sent by the synchronization source includes: determining the synchronization source of the terminal according to at least one of a frequency band, received power, synchronization priority, or SCS of the synchronization signal sent by the synchronization source.

In some embodiments, the determining the synchronization source of the terminal according to the frequency band of the synchronization signal sent by the synchronization source incudes: if accuracy of the synchronization signal detected by the terminal meets requirements of the terminal, selecting any one synchronization source from synchronization sources that send high-frequency synchronization signals and low-frequency synchronization signals as the synchronization source of the terminal; or if the accuracy of the synchronization signal detected by the terminal which is in a frequency band higher than a first preset value does not meet the requirements of the terminal, selecting one synchronization source from the synchronization sources that send low-frequency synchronization signals as the synchronization of the terminal source; or if the accuracy of the synchronization signal detected by the terminal which is in a frequency band lower than a second preset value does not meet the requirements of the terminal, selecting one synchronization source from the synchronization sources that send high-frequency synchronization signals as the synchronization of the terminal source, wherein the frequency band of the high-frequency band synchronization signal is greater than the first preset value, the frequency band of the low-frequency band synchronization signal is less than the second preset value, and the first preset value is greater than or equal to the second preset value.

In some embodiments, the determining the synchronization source of the terminal according to the received power of the synchronization signal sent by the synchronization source includes: determining one synchronization source sending the synchronization signal having a received power higher than a received power threshold as the synchronization source of the terminal, wherein the received power threshold is a received power threshold corresponding to SCS corresponding to a preset frequency band.

In some embodiments, the determining the synchronization source of the terminal according to the synchronization priority includes: when the received power of the synchronization signal detected by the synchronization source meets the requirements of the terminal, selecting one synchronization source having a highest priority for sending the synchronization signal as the synchronization source of the terminal.

In some embodiments, the determining the synchronization source of the terminal according to the SCS includes: when the received power of the synchronization signal detected by the terminal meets the requirements of the terminal, and the priority of synchronization source for sending the synchronization signal is the same, selecting one synchronization source sending the synchronization signal having the strongest strength from the synchronization sources that send the synchronization signals as the synchronization source of the terminal or selecting one synchronization source with the largest SCS as the synchronization source of the terminal.

In some embodiments, when the terminal supports two or more synchronization sources, the determining the synchronization source of the terminal according to the synchronization signal sent by the synchronization source includes: determining the synchronization source of the terminal according to relationship between a number of synchronization sources supported by the terminal and a number of BWPs configured for the terminal.

In some embodiments, the determining the synchronization source of the terminal according to the relationship between the number of synchronization sources supported by the terminal and the number of BWPs configured for the terminal includes: if the number of synchronization sources supported by the terminal is less than or equal to the number of BWPs configured for the terminal, determining the synchronization source of the terminal according to at least one of the received power, synchronization priority, and a synchronization error range of the synchronization signal sent by the synchronization source; or if the number of synchronization sources supported by the terminal is greater than the number of BWPs configured for the terminal, determining at least two synchronization sources supported by the terminal as the synchronization source of the terminal.

In some embodiments, the determining the synchronization source of the terminal according to at least one of the received power, the synchronization priority, and the synchronization error range of the synchronization signal sent by the synchronization source includes: if the terminal detects synchronization signals sent by a plurality of synchronization sources with different BWPs having the same SCS in the same frequency band, and if the received power of the synchronization signals meet the requirements of the terminal, determining one synchronization source with the highest priority as the synchronization source of the terminal; or if the terminal detects synchronization signals sent by a plurality of synchronization sources with different BWPs having different SCSs in the same frequency band, if the synchronization error range of the synchronization signal is less than a preset range value, selecting one synchronization source from the two or more synchronization sources supported by the terminal as the synchronization source of the terminal; otherwise, determining the two or more synchronization sources supported by the terminal as the synchronization source of the terminal; or if the terminal detects synchronization signals sent by a plurality of synchronization sources with different BWPs having the same SCS in different frequency bands, if synchronization error ranges of the synchronization signals are less than a preset range value, selecting one synchronization source form the two or more synchronization sources supported by the terminal as the synchronization source of the terminal; otherwise, determining the two or more synchronization sources supported by the terminal as the synchronization source of the terminal; or if the terminal detects synchronization signals sent by a plurality synchronization sources with different BWPs having different SCSs in different frequency bands, determining the two or more synchronization sources supported by the terminal as the synchronization sources of the terminal.

In some embodiments, the selecting one synchronization source from two or more synchronization sources supported by the terminal as the synchronization source of the terminal includes: when the received power of the synchronization signal meets the requirements of the terminal, and the synchronization priority is the same, selecting one synchronization source with the strongest signal strength from the two or more synchronization sources supported by the terminal as the synchronization source of the terminal; or when the received power of the synchronization signal meets the requirements of the terminal, selecting one synchronization source with the highest synchronization priority from two or more synchronization sources supported by the terminal as the synchronization source of the terminal.

A terminal includes: a transceiver, configured to detect a synchronization signal of a global navigation satellite system (GNSS); and a processor, configured to, when the transceiver has detected the synchronization signal of the GNSS, use the GNSS as a synchronization source of a terminal; otherwise, determine a synchronization source of the terminal according to receiving capability of the terminal and network configuration information.

In some embodiments, the transceiver is further configured to: send the synchronization signal on a synchronization sub-frame of configured different bandwidth parts (BWP) according to subcarrier spacing (SCS) supported by the terminal and sending capability of the terminal.

In some embodiments, when the processor determines the synchronization source of the terminal according to the capability of the terminal and network configuration information, the processor is configured to: detect the synchronization signal sent by the synchronization source on the synchronization sub-frame of the configured different BWPs according to the receiving capability of the terminal and the SCS supported by the terminal; and determine the synchronization source of the terminal according to the synchronization signal sent by the synchronization source.

In some embodiments, when the terminal supports one synchronization source, and the processor determines the synchronization source of the terminal according to the synchronization signal sent by the synchronization source, the processor is specifically configured to: determine the synchronization source of the terminal according to at least one of a frequency band, received power, synchronization priority, or SCS of the synchronization signal sent by the synchronization source.

In some embodiments, when the processor determines the synchronization source of the terminal according to the frequency band of the synchronization signal sent by the synchronization source, the processor is configured to: if accuracy of the synchronization signal detected by the terminal meets requirements of the terminal, select any one synchronization source from synchronization sources that send high-frequency synchronization signals and low-frequency synchronization signals as the synchronization source of the terminal; or if the accuracy of the synchronization signal detected by the terminal which is in a frequency band higher than a first preset value does not meet the requirements of the terminal, select one synchronization source from the synchronization sources that send low-frequency synchronization signals as the synchronization of the terminal source; or if the accuracy of the synchronization signal detected by the terminal which is in a frequency band lower than a second preset value does not meet the requirements of the terminal, select one synchronization source from the synchronization sources that send high-frequency synchronization signals as the synchronization of the terminal source, wherein the frequency band of the high-frequency band synchronization signal is greater than the first preset value, the frequency band of the low-frequency band synchronization signal is less than the second preset value, and the first preset value is greater than or equal to the second preset value.

In some embodiments, when the processor determines the synchronization source of the terminal according to the received power of the synchronization signal sent by the synchronization source, the processor is configured to: determine one synchronization source sending the synchronization signal having a received power higher than a received power threshold as the synchronization source of the terminal, and the received power threshold is a received power threshold corresponding to SCS corresponding to a preset frequency band.

In some embodiments, when the processor determines the synchronization source of the terminal according to the synchronization priority, the processor is configured to: when the received power of the synchronization signal detected by the synchronization source meets the requirements of the terminal, selecting one synchronization source having the highest priority for sending the synchronization signal as the synchronization source of the terminal.

In some embodiments, when the processor determines the synchronization source of the terminal according to the SCS, the processor is configured to: when the received power of the synchronization signal detected by the terminal meets the requirements of the terminal, and the priority of synchronization source for sending the synchronization signal is the same, select one synchronization source sending the synchronization signal having the strongest strength from the synchronization sources that send the synchronization signals as the synchronization source of the terminal or select one synchronization source with the largest SCS as the synchronization source of the terminal.

In some embodiments, when the terminal supports two or more synchronization sources, and the processor determines the synchronization source of the terminal according to the synchronization signal sent by the synchronization source, the processor is configured to: determine the synchronization source of the terminal according to relationship between a number of synchronization sources supported by the terminal and a number of BWPs configured for the terminal.

In some embodiments, the processor determines the synchronization source of the terminal according to the relationship between the number of synchronization sources supported by the terminal and the number of BWPs configured for the terminal, and the processor is configured to: if the number of synchronization sources supported by the terminal is less than or equal to the number of BWPs configured for the terminal, determine the synchronization source of the terminal according to at least one of the received power, synchronization priority, and a synchronization error range of the synchronization signal sent by the synchronization source; or if the number of synchronization sources supported by the terminal is greater than the number of BWPs configured for the terminal, determine at least two synchronization sources supported by the terminal as the synchronization source of the terminal.

In some embodiments, when the processor determines the synchronization source of the terminal according to at least one of the received power, the synchronization priority, and the synchronization error range of the synchronization signal sent by the synchronization source, the processor is configured to: if the terminal detects synchronization signals sent by a plurality of synchronization sources with different BWPs having the same SCS in the same frequency band, and if the received power of the synchronization signals meet the requirements of the terminal, determine one synchronization source with the highest priority as the synchronization source of the terminal; or if the terminal detects synchronization signals sent by a plurality of synchronization sources with different BWPs having different SCSs in the same frequency band, if the synchronization error range of the synchronization signal is less than a preset range value, select one synchronization source from the two or more synchronization sources supported by the terminal as the synchronization source of the terminal; otherwise, determine the two or more synchronization sources supported by the terminal as the synchronization source of the terminal; or if the terminal detects synchronization signals sent by a plurality of synchronization sources with different BWPs having the same SCS in different frequency bands, if synchronization error ranges of the synchronization signals are less than a preset range value, select one synchronization source form the two or more synchronization sources supported by the terminal as the synchronization source of the terminal; otherwise, determine the two or more synchronization sources supported by the terminal as the synchronization source of the terminal; or if the terminal detects synchronization signals sent by a plurality synchronization sources with different BWPs having different SCSs in different frequency bands, determine the two or more synchronization sources supported by the terminal as the synchronization sources of the terminal.

In some embodiments, when the processor selects one synchronization source from the two or more synchronization sources supported by the terminal as the synchronization source of the terminal, the processor is configured to: when the received power of the synchronization signal meets the requirements of the terminal, and the synchronization priority is the same, select one synchronization source with the strongest signal strength from the two or more synchronization sources supported by the terminal as the synchronization source of the terminal; or when the received power of the synchronization signal meets the requirements of the terminal, select one synchronization source with the highest synchronization priority from two or more synchronization sources supported by the terminal as the synchronization source of the terminal.

A device for determining a synchronization source includes: a transceiver module, configured to detect a synchronization signal of a global navigation satellite system (GNSS); a processing module, configured to, when the transceiver module has detected the synchronization signal of the GNSS, use the GNSS as the synchronization source of a terminal; otherwise, determine the synchronization source of the terminal according to receiving capability of the terminal and network configuration information.

A terminal includes: a processor configured to perform the following functions: detecting a synchronization signal of a global navigation satellite system (GNSS); when the synchronization signal of the GNSS is detected, using the GNSS as a synchronization source of a terminal; otherwise, determining the synchronization source of the terminal according to receiving capability of the terminal and network configuration information.

A computer storage medium, includes instructions, wherein when the instructions are executed on a computer, the computer executes the above method.

The above technical solutions of the present disclosure have at least the following beneficial effects: the synchronization signal of the GNSS is detected; if the synchronization signal of the GNSS can be detected, the GNSS is used as the synchronization source of the terminal; otherwise, the synchronization source of the terminal is determined according to the receiving capability of the terminal and the network configuration information. When determining the synchronization source, the receiving and processing capability of the UE, synchronization accuracy, and reliability are fully considered. The above-mentioned method of the present disclosure can be used for 5G NR V2X synchronization.

DETAILED DESCRIPTION

Hereinafter, exemplary embodiments of the present disclosure will be described in more detail with reference to the accompanying drawings. Although exemplary embodiments of the present disclosure are shown in the drawings, it should be understood that the present disclosure can be implemented in various forms and should not be limited by the embodiments set forth herein. On the contrary, these embodiments are provided to enable a more thorough understanding of the present disclosure and to fully convey the scope of the present disclosure to those skilled in the art.

The embodiments of the present disclosure are directed to the problem that the terminal cannot determine the synchronization source in the case of multiple synchronization sources in the 5G NR V2X network in related technologies, and provides a method for determining the synchronization source of the terminal, so that in the case of multiple synchronization sources, the terminal can determine its own synchronization source, so that a synchronization signal is sent by using the determined synchronization source as a reference. Multiple possible synchronization sources include: GNSS (Global Navigation Satellite System); base station eNB in the LTE network; an LTE-V2X terminal (may be directly or indirectly synchronized with GNSS, directly or indirectly synchronized with eNB, and self-synchronized between UEs); the base station gNB in 5G NR network; a 5G NR-V2X terminal (may be directly or indirectly synchronized with GNSS, directly or indirectly synchronized with gNB, self-synchronization between UEs).

Figure 1:
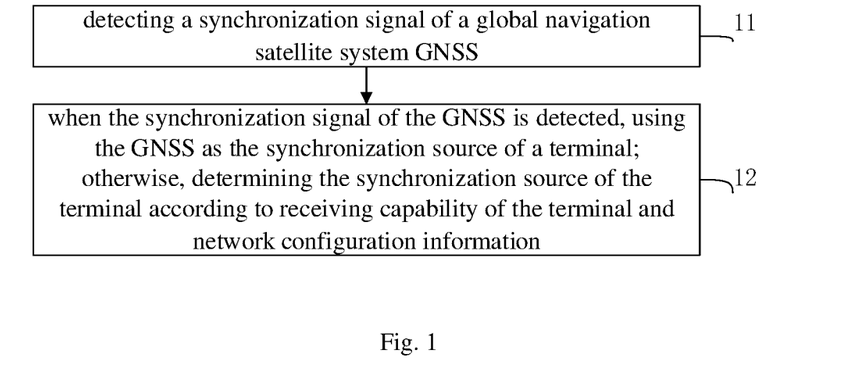
FIG. 1 shows a schematic flowchart showing a method for determining a synchronization source according to an embodiment of the present disclosure.

As shown in FIG. 1, an embodiment of the present disclosure provides a method for determining a synchronization source, which is applied to a terminal, and the method includes the following steps.

Step 11: detecting a synchronization signal of a global navigation satellite system (GNSS).

Step 12: when the synchronization signal of the GNSS has be detected, using the GNSS as a synchronization source of a terminal; otherwise, determining a synchronization source of the terminal according to receiving capability of the terminal and network configuration information.

This embodiment of the present disclosure detects the synchronization signal of the GNSS, and if the synchronization signal of the GNSS can be detected, the GNSS is used as the synchronization source of the terminal; otherwise, the synchronization source of the terminal is determined according to the receiving capability of the terminal and the network configuration information. This embodiment can be used for 5G NR V2X synchronization, and fully considers the receiving and processing capabilities of the UE, as well as indicators such as synchronization accuracy and reliability, so as to realize the determination of the synchronization source of the terminal.

In the embodiments of the present disclosure, regardless of whether the capability of the terminal is to support or maintain one synchronization source or multiple synchronization sources, if the terminal can detect the synchronization signal of the GNSS, the terminal synchronizes with the GNSS. Further, after the GNSS is used as the synchronization source of the terminal, the method may further include: sending the synchronization signal on a synchronization sub-frame of configured different bandwidth parts (BWP) according to subcarrier spacing SCS supported by the terminal and sending capability of the terminal. Taking into account the sending capability of the terminal, it is ensured that the synchronization signal is sent on a carrier with high service priority.

In this embodiment, if the UE is configured to synchronize with GNSS, and if the UE can receive and detect a reliable GNSS signal, the UE will synchronize directly with the GNSS. There is no need to consider synchronization of the UE with LTE eNB or 5G NR gNB, and the UE does not need to receive synchronization signals sent by other nodes.

In the embodiment of the present disclosure, if the terminal does not detect the GNSS signal, the synchronization source of the terminal is determined according to the capability of the terminal and network configuration information, which may specifically include the following steps.

Step 121: detecting the synchronization signal sent by the synchronization source on the synchronization sub-frame of the configured different BWPs according to the receiving capability of the terminal and the SCS supported by the terminal.

Step 122: determining the synchronization source of the terminal according to the synchronization signal sent by the synchronization source.

If the terminal supports one synchronization source, step 122 may include the following steps.

1221. determining the synchronization source of the terminal according to at least one of a frequency band, received power, synchronization priority, or SCS of the synchronization signal sent by the synchronization source.

Here, the determining the synchronization source of the terminal according to the frequency band of the synchronization signal sent by the synchronization source specifically includes selecting the synchronization source according to the accuracy and reliability of the synchronization signal in different frequency bands.

Here, the determining the synchronization source of the terminal according to the received power of the synchronization signal sent by the synchronization source specifically includes determining one synchronization source sending the synchronization signal having a received power higher than a received power threshold as the synchronization source of the terminal, and the received power threshold is a received power threshold corresponding to SCS corresponding to a preset frequency band.

Here, the determining the synchronization source of the terminal according to the synchronization priority of the synchronization signal sent by the synchronization source specifically includes, when the received power of the synchronization signal detected by the synchronization source meets the requirements of the terminal, selecting one synchronization source having a highest priority for sending the synchronization signal as the synchronization source.

Here, the determining the synchronization source of the terminal according to the SCS of the synchronization signal sent by the synchronization source specifically includes, when the received power is satisfied and the synchronization priority is the same, selecting the synchronization source based on the strongest signal; or when the received power is satisfied and the synchronization priority is the same, selecting the synchronization source based on a bigger SCS, and acquiring the synchronization signal with smaller time granularity.

Specifically, in step 1221, determining the synchronization source of the terminal according to the frequency band of the synchronization signal sent by the synchronization source includes the following steps.

1) if accuracy of the synchronization signal detected by the terminal meets requirements of the terminal, any one synchronization source is selected from synchronization sources that send high-frequency synchronization signals and low-frequency synchronization signals as the synchronization source of the terminal; or 2) if the accuracy of the synchronization signal detected by the terminal which is in a frequency band higher than a first preset value does not meet the requirements of the terminal, one synchronization source is selected from the synchronization sources that send low-frequency synchronization signals as the synchronization of the terminal source; or 3) if the accuracy of the synchronization signal detected by the terminal which is in a frequency band lower than a second preset value does not meet the requirements of the terminal, one synchronization source is selected from the synchronization sources that send high-frequency synchronization signals as the synchronization of the terminal source.

The frequency band of the high-frequency band synchronization signal is greater than the first preset value, the frequency band of the low-frequency band synchronization signal is less than the second preset value, and the first preset value is greater than or equal to the second preset value.

In this embodiment, if the accuracy of the high-frequency band synchronization signal can meet the requirements, the synchronization source signal can be selected from the high-frequency band signals and the low-frequency band signals; if the accuracy of the high-frequency band synchronization signal cannot meet the requirements due to processing such as frequency multiplication errors, the synchronization source signal can only be selected from the low-frequency band signals; if the accuracy of the low-frequency band synchronization signal cannot meet the requirements due to processing such as frequency multiplication errors, the synchronization source signal can only be selected from the high-frequency band signals.

In step 1221, determining the synchronization source of the terminal according to the received power of the synchronization signal sent by the synchronization source includes: determine a synchronization source which sends a synchronization signal having received power greater than the received power threshold as the synchronization source of the terminal. The received power threshold is a received power threshold corresponding to the subcarrier spacing SCS corresponding to a preset frequency band.

In this embodiment, a synchronization source which sends the synchronization signal having a received power higher than the received power threshold is determined as the synchronization source of the terminal, and the received power threshold is the received power threshold corresponding to the frequency band and corresponding to the SCS.

In step 1221, determining the synchronization source of the terminal according to the synchronization priority includes: if the received power of the synchronization signal detected by the terminal meets the needs of the terminal, a synchronization source with the highest priority for sending the synchronization signal is used as the synchronization source of the terminal.

In this embodiment, when the received power is satisfied, the one with the higher synchronization priority is selected as the synchronization source.

In step 1221, determining the synchronization source of the terminal according to the SCS includes: if the received power of the synchronization signal detected by the terminal meets the needs of the terminal, and the priorities of the synchronization sources that sends the synchronization signal are the same, a synchronization source sending the strongest synchronization signal is selected as the synchronization source of the terminal or a synchronization source having a maximum SCS is selected as the synchronization source of the terminal In this embodiment, when the received power is met and the synchronization priority is the same, the synchronization source sending the strongest synchronization signal can be selected as the synchronization source; or, when the received power is met and the synchronization priority is the same, a synchronization source having the maximum SCS is selected as the synchronization source or a synchronization source sending the synchronization signal obtained with a smaller time granularity is selected as the synchronization source.

In the embodiment of the present disclosure, if the terminal supports more than two synchronization sources, step 122 may include the following step.

Step 1222: determining the synchronization source of the terminal according to the relationship between the number of synchronization sources supported by the terminal and the number of BWPs configured for the terminal.

Specifically, this step 1222 may include the following steps.

Step 12221: if the number of synchronization sources supported by the terminal is less than or equal to the number of BWPs configured for the terminal, determining the synchronization source of the terminal according to at least one of the received power, synchronization priority, and a synchronization error range of the synchronization signal sent by the synchronization source; that is, if the number of received and maintained synchronization sources supported by the capability of the UE N1 is less than or equal to the total number of configured different BWPs N2, up to N1 synchronization sources may be maintained according to the received power, the synchronization priority, and the synchronization error range of the synchronization signal sent by the synchronization source.

Step 12222: if the number of synchronization sources supported by the terminal is greater than the number of BWPs configured for the terminal, determining at least two synchronization sources supported by the terminal as the synchronization source of the terminal. In other words, if the number of received and maintained synchronization sources supported by the capability of the UE N1 is larger than the total number of configured different BWPs N2, a plurality of synchronization sources may be maintained without considering the differences of the band, BWP and SCS because the capability of the UE exceeds the configured synchronization sources that need to be maintained.

In the embodiment of the present disclosure, the foregoing step 12221 may specifically include the following steps.

1) if the terminal detects synchronization signals sent by a plurality of synchronization sources with different BWPs having the same SCS in the same frequency band, and if the received power of the synchronization signals meet the requirements of the terminal, the synchronization source with the highest priority is determined as the synchronization source of the terminal. In this case, for different BWPs in the same band having the sane SCS, when the received power is met and the synchronization priority is the same, a synchronization source receiving the strongest synchronization signal is selected as the synchronization source; when the received power is met, the synchronization source with high synchronization priority is selected, so that in the same band, a synchronization source of only one BWP needs to be maintained as the synchronization source of other BWPs having the same SCS; or 2) if the terminal detects synchronization signals sent by a plurality of synchronization sources with different BWPs having different SCSs in the same frequency band, if the synchronization error range of the synchronization signal is less than a preset range value, one synchronization source is selected from the two or more synchronization sources supported by the terminal; otherwise, two or more synchronization sources supported by the terminal are used as the synchronization source of the terminal; among them, the two or more synchronization sources supported by the terminal are selected as the synchronization source. The selecting one synchronization source from the two or more synchronization sources supported by the terminal may include: when the received power of the synchronization signal meets the requirements of the terminal and the synchronization priority is the same, selecting a synchronization source with the strongest signal strength from two or more synchronization sources supported by the terminal as the synchronization source of the terminal; or when the received power of the synchronization signal meets the requirements of the terminal, selecting one synchronization source with the highest synchronization priority from two or more synchronization sources supported by the terminal as the synchronization source of the terminal. In this case, for different BWPs having different SCSs in the same band, if synchronization signal errors of different BWPs having different SCSs do not exceed a range by maintaining one synchronization source, the synchronization source of only one BWP needs to be maintained as the synchronization source of other BWPs having the same SCS; otherwise, synchronization sources corresponding to different SCSs may be maintained; or 3) if the terminal detects synchronization signals sent by a plurality of synchronization sources with different BWPs having the same SCS in different frequency bands, if synchronization error ranges of the synchronization signals are less than a preset range value, selecting one synchronization source form the two or more synchronization sources supported by the terminal; otherwise, selecting the two or more synchronization sources supported by the terminal as the synchronization source of the terminal. The selecting one synchronization source from the two or more synchronization sources supported by the terminal may include: when the received power of the synchronization signal meets the requirements of the terminal and the synchronization priority is the same, selecting one synchronization source with the strongest signal strength from the two or more synchronization sources supported by the terminal as the synchronization source of the terminal; or when the received power of the synchronization signal meets the requirements of the terminal, selecting the synchronization source with the highest priority from the two or more synchronization sources supported by the terminal as the synchronization source of the terminal. In this case, for different BWPs having the same SCS of different bands, if synchronization signal errors of different BWPs having the same SCS of different bands do not exceed a range by maintaining one synchronization source, the synchronization source of only one BWP needs to be maintained as the synchronization source of BWPs having the same SCS of other bands, synchronization can be maintained through configuring across different carriers; otherwise, if the synchronization error is unacceptable, a plurality of synchronization sources need to be maintained; or 4) if the terminal detects synchronization signals sent by a plurality synchronization sources of different BWPs having different SCSs in different frequency bands, the two or more synchronization sources supported by the terminal are determined as the synchronization sources of the terminal. In this case: for different BWP having different SCSs of different bands, different synchronization sources need to be maintained.

In the above-mentioned embodiment of the present disclosure, the synchronization signal of the GNSS is detected; if the synchronization signal of the GNSS can be detected, the GNSS is used as the synchronization source of the terminal; otherwise, the synchronization source of the terminal is determined according to the receiving capability of the terminal and the network configuration information. When determining the synchronization source, the receiving and processing capability of the UE, synchronization accuracy, and reliability are fully considered. The above-mentioned method of the present disclosure can be used for 5G NR V2X synchronization.

Figure 2:
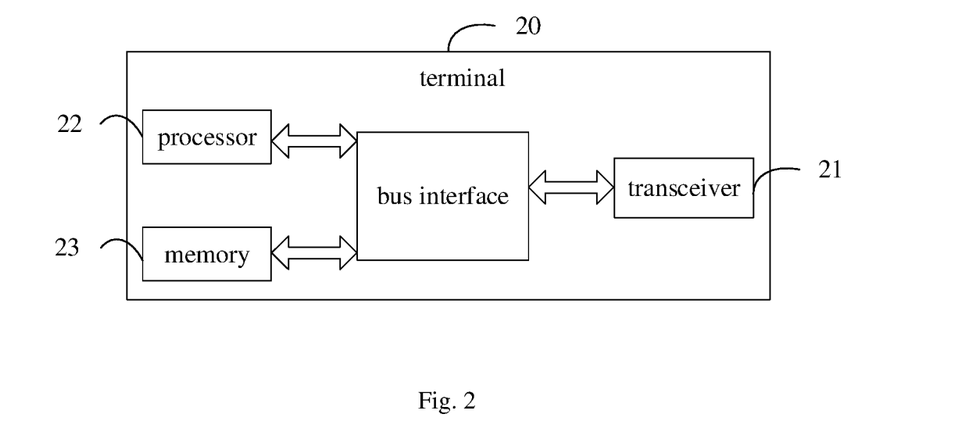
FIG. 2 shows a schematic structural diagram showing a terminal according to an embodiment of the present disclosure.

As shown in FIG. 2, an embodiment of the present disclosure further provides a terminal 20, including: a transceiver 21, configured to detect a synchronization signal of a global navigation satellite system (GNSS); and a processor 22, configured to, when the transceiver has detected the synchronization signal of the GNSS, use the GNSS as a synchronization source of a terminal; otherwise, determine a synchronization source of the terminal according to receiving capability of the terminal and network configuration information.

The transceiver is further configured to: send the synchronization signal on a synchronization sub-frame of configured different bandwidth parts (BWP) according to subcarrier spacing (SCS) supported by the terminal and sending capability of the terminal.

When the processor determines the synchronization source of the terminal according to the capability of the terminal and network configuration information, it is specifically configured to: detect the synchronization signal sent by the synchronization source on the synchronization sub-frame of the configured different BWPs according to the receiving capability of the terminal and the SCS supported by the terminal; and determine the synchronization source of the terminal according to the synchronization signal sent by the synchronization source.

When the terminal supports one synchronization source, and the processor determines the synchronization source of the terminal according to the synchronization signal sent by the synchronization source, it is specifically configured to: determine the synchronization source of the terminal according to at least one of a frequency band, received power, synchronization priority, or SCS of the synchronization signal sent by the synchronization source.

When the processor determines the synchronization source of the terminal according to the frequency band of the synchronization signal sent by the synchronization source, it is specifically configured to: if accuracy of the synchronization signal detected by the terminal meets requirements of the terminal, select any one synchronization source from synchronization sources that send high-frequency synchronization signals and low-frequency synchronization signals as the synchronization source of the terminal; or if the accuracy of the synchronization signal detected by the terminal which is in a frequency band higher than a first preset value does not meet the requirements of the terminal, select one synchronization source from the synchronization sources that send low-frequency synchronization signals as the synchronization of the terminal source; or if the accuracy of the synchronization signal detected by the terminal which is in a frequency band lower than a second preset value does not meet the requirements of the terminal, select one synchronization source from the synchronization sources that send high-frequency synchronization signals as the synchronization of the terminal source. The frequency band of the high-frequency band synchronization signal is greater than the first preset value, the frequency band of the low-frequency band synchronization signal is less than the second preset value, and the first preset value is greater than or equal to the second preset value.

When the processor determines the synchronization source of the terminal according to the received power of the synchronization signal sent by the synchronization source, it is specifically configured to: determine one synchronization source sending the synchronization signal having a received power higher than a received power threshold as the synchronization source of the terminal, and the received power threshold is a received power threshold corresponding to SCS corresponding to a preset frequency band.

When the processor determines the synchronization source of the terminal according to the synchronization priority, it is specifically configured to: when the received power of the synchronization signal detected by the synchronization source meets the requirements of the terminal, selecting one synchronization source having a highest priority for sending the synchronization signal as the synchronization source.

When the processor determines the synchronization source of the terminal according to the SCS, it is specifically configured to: when the received power of the synchronization signal detected by the terminal meets the requirements of the terminal, and the priority of synchronization source for sending the synchronization signal is the same, select one synchronization source sending a synchronization signal having the strongest strength from the synchronization sources that send the synchronization signals as the synchronization source of the terminal or select one synchronization source with the largest SCS as the synchronization source of the terminal.

When the terminal supports two or more synchronization sources, and the processor determines the synchronization source of the terminal according to the synchronization signal sent by the synchronization source, it is specifically configured to: determine the synchronization source of the terminal according to relationship between a number of synchronization sources supported by the terminal and a number of BWPs configured for the terminal.

The processor determines the synchronization source of the terminal according to the relationship between the number of synchronization sources supported by the terminal and the number of BWPs configured for the terminal, and is specifically configured to: if the number of synchronization sources supported by the terminal is less than or equal to the number of BWPs configured for the terminal, determine the synchronization source of the terminal according to at least one of the received power, synchronization priority, and a synchronization error range of the synchronization signal sent by the synchronization source; or if the number of synchronization sources supported by the terminal is greater than the number of BWPs configured for the terminal, determine at least two synchronization sources supported by the terminal as the synchronization source of the terminal.

When the processor determines the synchronization source of the terminal according to at least one of the received power, the synchronization priority, and the synchronization error range of the synchronization signal sent by the synchronization source, it is specifically configured to:

if the terminal detects synchronization signals sent by a plurality of synchronization sources with different BWPs having the same SCS in the same frequency band, and if the received power of the synchronization signals meet the requirements of the terminal, determine one synchronization source with the highest priority as the synchronization source of the terminal; or if the terminal detects synchronization signals sent by a plurality of synchronization sources with different BWPs having different SCSs in the same frequency band, if the synchronization error range of the synchronization signal is less than a preset range value, select one synchronization source from the two or more synchronization sources supported by the terminal as the synchronization source of the terminal; otherwise, determine the two or more synchronization sources supported by the terminal as the synchronization source of the terminal; or if the terminal detects synchronization signals sent by a plurality of synchronization sources with different BWPs having the same SCS in different frequency bands, if synchronization error ranges of the synchronization signals are less than a preset range value, select one synchronization source form the two or more synchronization sources supported by the terminal as the synchronization source of the terminal; otherwise, determine the two or more synchronization sources supported by the terminal as the synchronization source of the terminal; or if the terminal detects synchronization signals sent by a plurality synchronization sources of different BWPs having different SCSs in different frequency bands, determine the two or more synchronization sources supported by the terminal as the synchronization sources of the terminal.

When the processor selects one synchronization source from the two or more synchronization sources supported by the terminal as the synchronization source of the terminal, it is specifically configured to: when the received power of the synchronization signal meets the requirements of the terminal, and the synchronization priority is the same, select one synchronization source with the strongest signal strength from the two or more synchronization sources supported by the terminal as the synchronization source of the terminal; or when the received power of the synchronization signal meets the requirements of the terminal, select one synchronization source with the highest synchronization priority from two or more synchronization sources supported by the terminal as the synchronization source of the terminal.

The terminal 20 may also include a memory 23, which is in communication connection with the processor 21 and the transceiver 22 via a bus interface, and is used to store information during the processing of the measurement results. Of course, the terminal may also include a communication interface, for example, a user interface.

It should be noted that this embodiment is a terminal corresponding to the foregoing method embodiment, and all implementations of the foregoing method embodiment are applicable to this embodiment, and the same technical effect can also be achieved.

Figure 3:
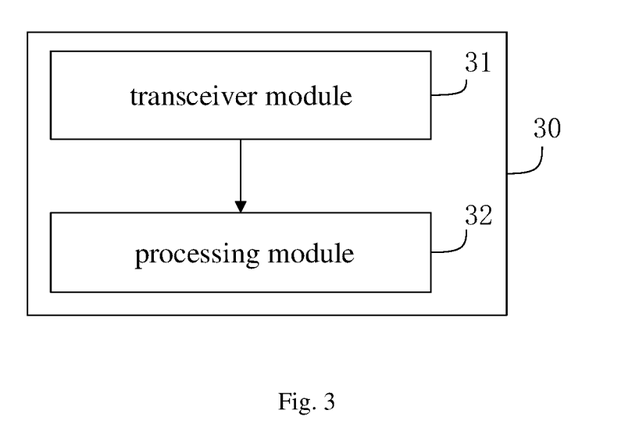
FIG. 3 shows a schematic diagram showings modules of a measuring device for a bandwidth part according to an embodiment of the present disclosure.

As shown in FIG. 3, an embodiment of the present disclosure also provides a device 30 for determining a synchronization source, including: a transceiver module 31, configured to detect a synchronization signal of a global navigation satellite system (GNSS); a processing module 32, configured to when the transceiver module has detected the synchronization signal of the GNSS, use the GNSS as a synchronization source of a terminal; otherwise, determine a synchronization source of the terminal according to receiving capability of the terminal and network configuration information.

It should be noted that this embodiment is a device corresponding to the foregoing method embodiment, and all implementations of the foregoing method embodiment are applicable to this embodiment, and the same technical effect can also be achieved.

The embodiment of the present disclosure also provides a terminal, including: a processor, configured to perform the following functions: detect a synchronization signal of a global navigation satellite system (GNSS); and when the synchronization signal of the GNSS has been detected, use the GNSS as a synchronization source of a terminal; otherwise, determine a synchronization source of the terminal according to receiving capability of the terminal and network configuration information.

Embodiments of the present disclosure also provide a computer storage medium, including instructions, when executed by a computer, making the computer to execute the method described above.

Those skilled in the art may realize that the units and algorithm steps of the examples described in combination with the embodiments disclosed herein can be implemented by electronic hardware, or a combination of computer software and electronic hardware. Whether these functions are executed by hardware or software depends on the specific application and design constraint conditions of the technical solution. Professionals and technicians can use different methods for each specific application to implement the described functions, but such implementation should not be considered beyond the scope of the present disclosure.

Those skilled in the art can clearly understand that, for the convenience and conciseness of description, the specific working process of the above-described system, device, and unit can refer to the corresponding process in the foregoing method embodiment, which will not be repeated here.

In the embodiments provided in the present disclosure, it should be understood that the disclosed device and method may be implemented in other ways. For example, the device embodiments described above are merely illustrative. For example, the division of the units is only a logical function division, and there may be other divisions in actual implementation, for example, multiple units or components may be combined or may be integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or each unit may exist alone physically, or two or more units may be integrated into one unit.

If the function is implemented in the form of a software functional unit and sold or used as an independent product, it can be stored in a computer readable storage medium. Based on this understanding, the technical solution of the present disclosure essentially or the part that contributes to the related technology of the technical solution can be embodied in the form of a software product. The computer software product is stored in a storage medium, including several instructions used to make a computer device (which may be a personal computer, a server, or a network device, etc.) execute all or part of the steps of the methods described in the various embodiments of the present disclosure. The aforementioned storage media include: U disk, mobile hard disk, ROM, RAM, magnetic disk or optical disk and other media that can store program codes.

In addition, it should be pointed out that in the device and method of the present disclosure, obviously, each component or each step can be decomposed and/or recombined. These decomposition and/or recombination should be regarded as equivalent solutions of the present disclosure. Moreover, the steps of performing the above series of processing can naturally be performed in a time sequence according to the order of description, but do not necessarily need to be performed in a time sequence, and some steps can be performed in parallel or independently of each other. Those skilled in the art can understand that all or any of the steps or components of the methods and devices of the present disclosure can be used in any computing device (including a processor, storage medium, etc.) or a network of computing devices, using hardware, firmware, software, or a combination of them. This can be achieved by those of ordinary skill in the art using their basic programming skills after reading the description of the present disclosure.

Therefore, the purpose of the present disclosure can also be realized by running a program or a group of programs on any computing device. The computing device may be a well-known general-purpose device. Therefore, the purpose of the present disclosure can also be achieved only by providing a program product containing program code for implementing the method or device. That is, such a program product also constitutes the present disclosure, and a storage medium storing such a program product also constitutes the present disclosure. Obviously, the storage medium may be any well-known storage medium or any storage medium developed in the future. It should also be pointed out that in the device and method of the present disclosure, obviously, each component or each step can be decomposed and/or recombined. These decomposition and/or recombination should be regarded as equivalent solutions of the present disclosure. In addition, the steps of performing the above-mentioned series of processing can naturally be performed in chronological order in the order of description, but do not necessarily need to be performed in chronological order. Some steps can be performed in parallel or independently of each other.

The above are optional implementations of the present disclosure. It should be note that for those of ordinary skill in the art, without departing from the principles described in the present disclosure, several improvements and modifications can be made. These improvements and modifications should also be within the protection scope of this disclosure

What is claimed is:

1. A method for determining a synchronization source, applied to a terminal, comprising:
   detecting a synchronization signal of a global navigation satellite system (GNSS); when the synchronization signal of the GNSS is detected, using the GNSS as the synchronization source of a terminal; otherwise, determining the synchronization source of the terminal according to receiving capability of the terminal and network configuration information;
   after using the GNSS as the synchronization source of the terminal, the method further comprises:
   sending the synchronization signal on a synchronization sub-frame of configured different bandwidth parts (BWP) according to subcarrier spacing (SCS) supported by the terminal and sending capability of the terminal;
   wherein determining the synchronization source of the terminal according to the capabilities of the terminal and network configuration information comprises:
detecting the synchronization signal sent by the synchronization source on the synchronization sub-frame of the configured different BWPs according to the receiving capability of the terminal and the SCS supported by the terminal; and
   determining the synchronization source of the terminal according to the synchronization signal sent by the synchronization source;
   wherein when the terminal supports one synchronization source, the determining the synchronization source of the terminal according to the synchronization signal sent by the synchronization source comprises:
determining the synchronization source of the terminal according to at least one of a frequency band or received power of the synchronization signal sent by the synchronization source,
   wherein the determining the synchronization source of the terminal according to the SCS comprises:
   when the received power of the synchronization signal detected by the terminal meets the requirements of the terminal, and the priority of synchronization source for sending the synchronization signal is the same, selecting one synchronization source with the largest SCS as the synchronization source of the terminal.

2. The method according to claim 1, wherein the determining the synchronization source of the terminal according to the frequency band of the synchronization signal sent by the synchronization source comprises:
   if accuracy of the synchronization signal detected by the terminal meets requirements of the terminal, selecting any one synchronization source from synchronization sources that send high-frequency synchronization signals and low-frequency synchronization signals as the synchronization source of the terminal; or
   if the accuracy of the synchronization signal detected by the terminal which is in a frequency band higher than a first preset value does not meet the requirements of the terminal, selecting one synchronization source from the synchronization sources that send low-frequency synchronization signals as the synchronization of the terminal source; or
   if the accuracy of the synchronization signal detected by the terminal which is in a frequency band lower than a second preset value does not meet the requirements of the terminal, selecting one synchronization source from the synchronization sources that send high-frequency synchronization signals as the synchronization of the terminal source,
   wherein the frequency band of the high-frequency band synchronization signal is greater than the first preset value, the frequency band of the low-frequency band synchronization signal is less than the second preset value, and the first preset value is greater than or equal to the second preset value.

3. The method according to claim 1, wherein the determining the synchronization source of the terminal according to the received power of the synchronization signal sent by the synchronization source comprises:
   determining one synchronization source sending the synchronization signal having a received power higher than a received power threshold as the synchronization source of the terminal, wherein the received power threshold is a received power threshold corresponding to SCS corresponding to a preset frequency band.

4. The method according to claim 1, wherein the determining the synchronization source of the terminal according to the synchronization priority comprises:
   when the received power of the synchronization signal detected by the synchronization source meets the requirements of the terminal, selecting one synchronization source having a highest priority for sending the synchronization signal as the synchronization source of the terminal.

5. The method according to claim 1, wherein when the terminal supports two or more synchronization sources, the determining the synchronization source of the terminal according to the synchronization signal sent by the synchronization source comprises:
   determining the synchronization source of the terminal according to relationship between a number of synchronization sources supported by the terminal and a number of BWPs configured for the terminal.

6. The method according to claim 5, wherein the determining the synchronization source of the terminal according to the relationship between the number of synchronization sources supported by the terminal and the number of BWPs configured for the terminal comprises:
   if the number of synchronization sources supported by the terminal is less than or equal to the number of BWPs configured for the terminal, determining the synchronization source of the terminal according to at least one of the received power, synchronization priority, and a synchronization error range of the synchronization signal sent by the synchronization source; or
   if the number of synchronization sources supported by the terminal is greater than the number of BWPs configured for the terminal, determining at least two synchronization sources supported by the terminal as the synchronization source of the terminal.

7. The method according to claim 6, wherein the determining the synchronization source of the terminal according to at least one of the received power, the synchronization priority, and the synchronization error range of the synchronization signal sent by the synchronization source comprises:
   if the terminal detects synchronization signals sent by a plurality of synchronization sources with different BWPs having the same SCS in the same frequency band, and if the received power of the synchronization signals meet the requirements of the terminal, determining one synchronization source with the highest priority as the synchronization source of the terminal; or if the terminal detects synchronization signals sent by a plurality of synchronization sources with different BWPs having different SCSs in the same frequency band, if the synchronization error range of the synchronization signal is less than a preset range value, selecting one synchronization source from the two or more synchronization sources supported by the terminal as the synchronization source of the terminal;

otherwise, determining the two or more synchronization sources supported by the terminal as the synchronization source of the terminal; or if the terminal detects synchronization signals sent by a plurality of synchronization sources with different BWPs having the same SCS in different frequency bands, if synchronization error ranges of the synchronization signals are less than a preset range value, selecting one synchronization source form the two or more synchronization sources supported by the terminal as the synchronization source of the terminal;

otherwise, determining the two or more synchronization sources supported by the terminal as the synchronization source of the terminal; or if the terminal detects synchronization signals sent by a plurality synchronization sources with different BWPs having different SCSs in different frequency bands, determining the two or more synchronization sources supported by the terminal as the synchronization sources of the terminal.

8. The method according to claim 7, wherein the selecting one synchronization source from two or more synchronization sources supported by the terminal as the synchronization source of the terminal comprises:

when the received power of the synchronization signal meets the requirements of the terminal, and the synchronization priority is the same, selecting one synchronization source with the strongest signal strength from the two or more synchronization sources supported by the terminal as the synchronization source of the terminal; or when the received power of the synchronization signal meets the requirements of the terminal, selecting one synchronization source with the highest synchronization priority from two or more synchronization sources supported by the terminal as the synchronization source of the terminal.

9. A terminal, comprising:
a transceiver, configured to detect a synchronization signal of a global navigation satellite system (GNSS); and
a processor, configured to, when the transceiver has detected the synchronization signal of the GNSS, use the GNSS as a synchronization source of a terminal; otherwise, determine a synchronization source of the terminal according to receiving capability of the terminal and network configuration information;
wherein the transceiver is further configured to: send the synchronization signal on a synchronization sub-frame of configured different bandwidth parts (BWP) according to subcarrier spacing (SCS) supported by the terminal and sending capability of the terminal;
wherein when the processor determines the synchronization source of the terminal according to the capability of the terminal and network configuration information, the processor is configured to:

detect the synchronization signal sent by the synchronization source on the synchronization sub-frame of the configured different BWPs according to the receiving capability of the terminal and the SCS supported by the terminal; and determine the synchronization source of the terminal according to the synchronization signal sent by the synchronization source;

wherein when the terminal supports one synchronization source, and the processor determines the synchronization source of the terminal according to the synchronization signal sent by the synchronization source, the processor is specifically configured to:

determine the synchronization source of the terminal according to at least one of a frequency band or received power of the synchronization signal sent by the synchronization source,
wherein when the processor determines the synchronization source of the terminal according to the SCS, the processor is configured to:
when the received power of the synchronization signal detected by the terminal meets the requirements of the terminal, and the priority of synchronization source for sending the synchronization signal is the same, select one synchronization source with the largest SCS as the synchronization source of the terminal.

10. The terminal according to claim 9, wherein when the processor determines the synchronization source of the terminal according to the frequency band of the synchronization signal sent by the synchronization source, the processor is configured to:

if accuracy of the synchronization signal detected by the terminal meets requirements of the terminal, select any one synchronization source from synchronization sources that send high-frequency synchronization signals and low-frequency synchronization signals as the synchronization source of the terminal; or if the accuracy of the synchronization signal detected by the terminal which is in a frequency band higher than a first preset value does not meet the requirements of the terminal, select one synchronization source from the synchronization sources that send low-frequency synchronization signals as the synchronization of the terminal source; or if the accuracy of the synchronization signal detected by the terminal which is in a frequency band lower than a second preset value does not meet the requirements of the terminal, select one synchronization source from the synchronization sources that send high-frequency synchronization signals as the synchronization of the terminal source, wherein the frequency band of the high-frequency band synchronization signal is greater than the first preset value, the frequency band of the low-frequency band synchronization signal is less than the second preset value, and the first preset value is greater than or equal to the second preset value.

11. The terminal according to claim 9, wherein when the processor determines the synchronization source of the terminal according to the received power of the synchronization signal sent by the synchronization source, the processor is configured to:

determine one synchronization source sending the synchronization signal having a received power higher than a received power threshold as the synchronization source of the terminal, and the received power threshold is a received power threshold corresponding to SCS corresponding to a preset frequency band.

12. The terminal according to claim 9, wherein when the processor determines the synchronization source of the terminal according to the synchronization priority, the processor is configured to:
when the received power of the synchronization signal detected by the synchronization source meets the requirements of the terminal, selecting one synchronization source having the highest priority for sending the synchronization signal as the synchronization source of the terminal.

* * * * *